June 21, 1955 P. E. OHLSON ET AL Re. 24,024

JACKETED STEAM DRIER

Original Filed May 16, 1951 2 Sheets-Sheet 1

INVENTORS

Paul E. Ohlson
Edward A. Hodge

BY Cushman, Darby & Cushman

ATTORNEYS

JACKETED STEAM DRIER

Original Filed May 16, 1951 2 Sheets-Sheet 2

INVENTORS
Paul E. Ohlson
Edward A. Hodge
BY Cushman, Darby & Cushman
ATTORNEYS

United States Patent Office

Re. 24,024
Reissued June 21, 1955

24,024

JACKETED STEAM DRIER

Paul E. Ohlson, Wilmington, and Edward A. Hodge, New Castle, Del., assignors to The Pusey & Jones Corporation, Wilmington, Del., a corporation of Delaware Original No. 2,677,899, dated May 11, 1954, Serial No. 226,698, May 16, 1951. Application for reissue February 7, 1955, Serial No. 486,746

15 Claims. (Cl. 34—124)

Matter enclosed in heavy brackets [ ] appears in the original patent but forms no part of this reissue specification; matter printed in italics indicates the additions made by reissue.

The present invention relates to steam jacketed driers of the type used in paper mills, food processing plants, industrial chemical manufacturing plants, and the like. Driers of the kind which are improved by the present invention are to be distinguished from heavy cast iron driers in which the entire interiors of the cylindrical drums are filled with steam, since jacketed driers conventionally have their interiors open to the atmosphere and comprise a pair of concentric, steel cylinders, providing a closed space therebetween, into which relatively high pressure steam is delivered, and from which condensate is removed.

A primary object of the present invention is to provide means for increasing the rate of heat transfer from the exterior surface of a steel jacketed drier to the material being dried.

To this end, an important object of the invention is to increase the velocity of steam flow through the jacket space in the drier. Such increased velocity of steam flow exerts a scouring action upon the inner surface of the outer cylinder and effectively prevents the formation of a film or layer of condensate on said surface, which, in conventional practice, acts as an insulating layer and reduces the rate of heat transfer from the steam to the cylinder. The scouring action, effected by the improvements of the present invention, also effectively removes air and non-condensable gases from the jacket space, thereby further improving the heat transfer rate.

It has been standard practice in the jacketed drier art to space the inner and outer cylinders substantially two inches apart, regardless of the diameter of the drier, which may vary from 36 inches to 144 inches. This relatively large jacket space results in numerous disadvantages which have not been appreciated or understood in the prior art. The velocity of steam flow in the jacket space is insufficient to effect the desired scouring action and the removal of condensate, air, and non-condensable gases. Accordingly, at low speed, the condensate puddles badly near the bottom of the drier, thereby interfering with heat transfer and increasing the power required to rotate the drier. At high speed, the condensate rims in a film around the entire inner surface of the outer cylinder and interferes with heat transfer. Air and non-condensable gases remain in the jacket space because of inadequate venting and low rate of steam flow.

No attempt in the past has been made to control the quality of the steam within the drier in such a manner as to effect maximum heat transfer. No means have been provided to effect even and uniform distribution of steam flow over the entire inner surface of the drier.

The purpose of the present invention is to overcome all of the foregoing defects; to produce a sufficiently high velocity of steam flow to scour air, water, and incondensable gases; to effect even and uniform distribution of steam flow within the jacket space; and to control the quality of the steam within the jacket to effect maximum heat transfer.

As a result of shop experimentation and theoretical calculations, it has been determined that a steam flow velocity, upon the introduction of the steam into the jacket space, of 150 feet per minute and a discharge velocity of low quality steam and condensate of 7 feet per minute or more is necessary to produce the desired scouring action and to effect proper removal of condensate, air, and non-condensable gases.

The objects of the present invention are accomplished, as explained in connection with the illustrative embodiments described below, by decreasing the radial dimension of the steam space between the outer and inner cylinders to substantially ⅜ of an inch, more or less, depending upon the diameter of the drier; by dividing the jacket space into a plurality of longitudinally extending compartments; by delivering the steam at high velocity to the leading ends of the compartment at a plurality of points through openings of accurately determined areas; and by providing means for removing low quality steam and condensate adjacent the trailing ends of the compartments through a plurality of apertures of accurately determined size, to control the quality of the steam and the velocity of discharge of steam and condensate. Improved means for effecting these several results are shown in the illustrative embodiment in the accompanying drawings, in which:

Figure 1:
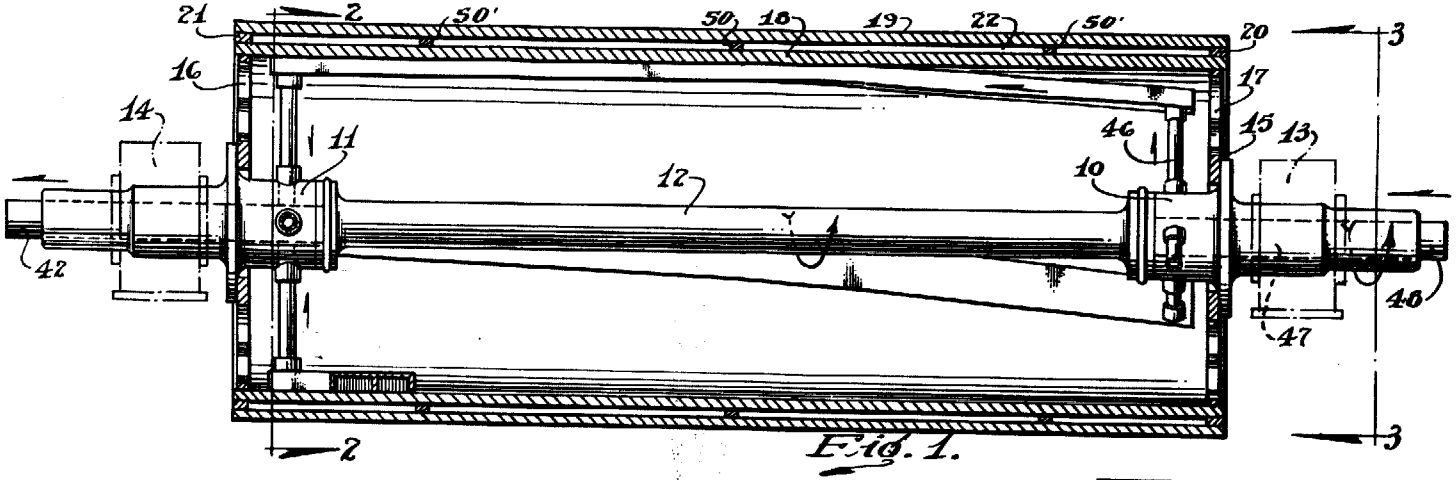
Figure 1 is a vertical longitudinal section of a drier.

A pair of hollow journals 10 and 11, interconnected by a central shaft 12 may be supported in conventional manner by suitable bearings, represented diagrammatically at 13 and 14. The journals carry end plates or heads 15 and 16, which may have openings 17 therein so that the interior of the drier is open to atmosphere. Secured to the outer margins of the two heads are a pair of inner and outer steel cylinders 18 and 19, disposed in closely spaced concentric relation and spaced apart by end rings 20 and 21, to which they are welded, to provide a closed jacket space 22.

Figure 5:
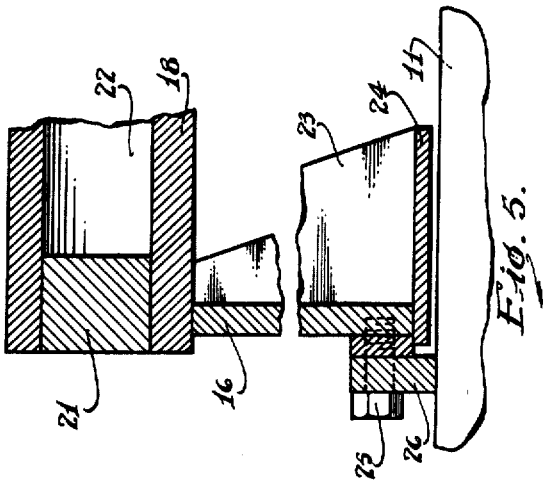
Figure 5 is a fragmentary axial section on an enlarged scale with certain parts broken away.

As indicated in Figure 5, the heads may be reinforced by radial webs 23, extending from the inner cylinder 18 to a supporting ring 24, secured to the journal 11 in any appropriate manner, as by bolts 25 extending through a flange 26 integral with or mounted upon the journal.

Figure 2:
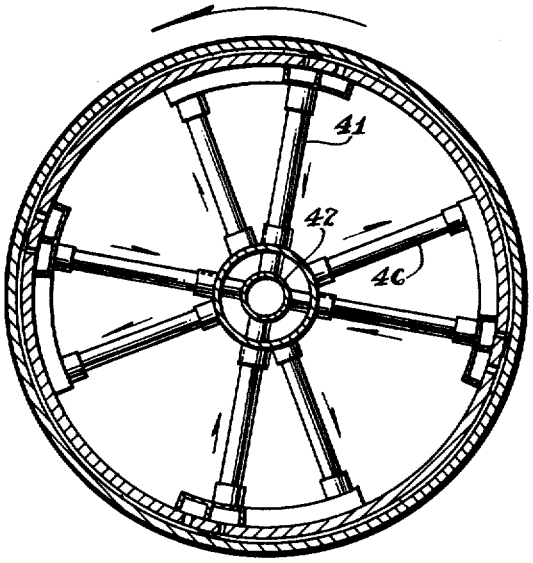
Figure 2 is a section taken on line 2—2 of Figure 1, on a somewhat larger scale.
Figure 3:
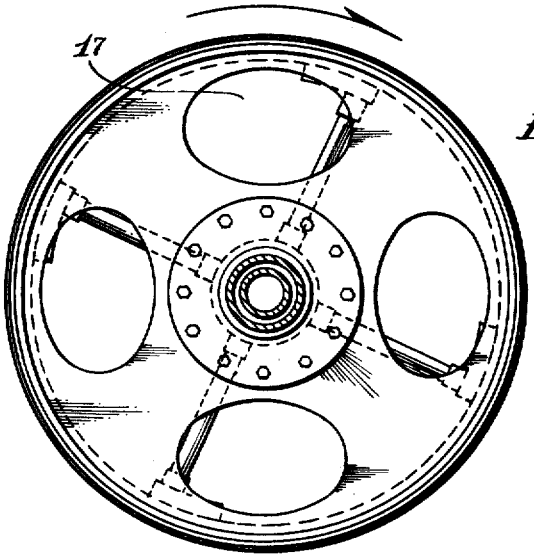
Figure 3 is a section and end elevation taken on line 3—3 of Figure 1.

The space 22 between the inner and outer cylinders is divided into a plurality of longitudinally extending compartments, by a plurality of stainless, spring steel vanes 30, having their inner portions 31 welded to the outer surface of the inner cylinder 18 and their outer edge portions 32 bearing against the inner surface of the outer cylinder 19 with spring pressure. As indicated by the arrows in Figures 2 and 4, the vanes are pitched forwardly and outwardly in the direction of rotation of the drier. Moreover, they extend longitudinally in angular relation to axial sections of the cylinder so that condensate engaged by their leading faces tends to flow, under the influence of inertia, gravity, and centrifugal force, toward their trailing ends.

The inner cylinder 18 is provided with a plurality of rows of apertures 33, one row being disposed adjacent the leading faces of each of the vanes 30, at the trailing end of each compartment in the space 22. These apertures provide means for the discharge of condensate, low-quality steam, air, and non-condensable gases from the several compartments; and such flow is facilitated by the scooping action of the vanes.

The inner cylinder 18 is also provided with a plurality of rows of openings 35, disposed in parallel relation to the apertures 33 with one row positioned behind each vane 30 and near the leading end of each compartment in the space 22. As hereinafter explained, steam flows through these openings into the several compartments. In order to prevent the direct impingement of the steam upon the inner surface of the outer cylinder, at points in alignment with the openings, and to effect a uniform dispersal of the steam, the openings 35 are fitted with nipples 36, having closed, circular outer ends, constituting baffles 37 and laterally directed, slotted openings 38 and 39, so that the steam is directed laterally, as distinguished from radially, into the jacket space 22.

Upon the inner surface of the inner cylinder, in alignment with each row of apertures 33, there is an outwardly facing trough 40, consisting of a U-shaped sheet metal strip welded to the cylinder 18 and disposed longitudinally in angular relation to axial sections of the drier, in the same manner as the vanes and the rows of apertures. Accordingly, condensate flowing inwardly through the apertures 33 into the troughs tends to flow longitudinally toward the trailing ends of the troughs or, in other words, toward the left in Figure 1.

At the latter end, each trough is connected to a radial pipe 41 having its inner end connected to an axial pipe 42, extending through the journal 11 and bearing 14, to a suitable condensate collecting trap and return steam line, not shown.

Figure 4:
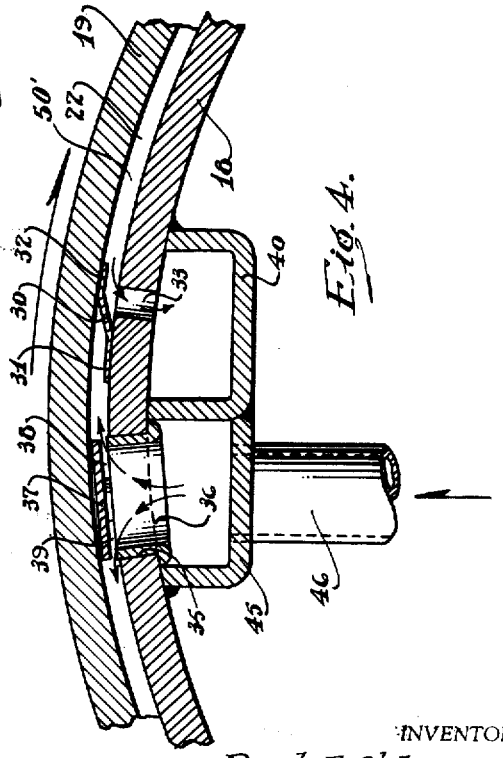
Figure 4 is an enlarged fragmentary section through the inner and outer cylinders and the steam delivery and condensate removal instrumentalities.

Adjacent each trough 40 is a second trough 45, which may consist of an L-section sheet metal strip, welded to the U-section strip 40 and to the inner surface of the inner drum 18, as illustrated in Figure 4. Each trough 45 encloses the associated row of openings 35 and nipples 36. At the right hand or leading end, each trough 45 is in communication with a radial steam delivery pipe 46, extending into the interior 47 of the right hand journal 10, to which is connected a steam supply pipe 48.

In many cases, particularly where the length of the drier exceeds the circumferential dimension, it has been found highly advantageous to divide the space 22 into a plurality of separate compartments, by positioning circumferential range 50 in the jacket space. For instance, the entire space may be divided into four compartments or chambers, longitudinally of the drum and each of these compartments again divided by the fins or vanes 30. One circumferentially extending ring 50 may be positioned midway between the end rings 20 and 21, and two other circumferential rings 50' midway between the first mentioned one and the end rings. Such an arrangement prevents a direct longitudinal flow from the steam inlets to the outlets; results in a more uniform, circumferential flow of steam in the several compartments, and provides an improved and more thorough scouring action for the removal of air and non-condensable gases. This arrangement has been found to be of importance and to produce highly advantageous results in elongated driers, such as those having a 60-inch diameter and a 238-inch length.

In the operation of the apparatus of the present invention, high quality steam at relatively high pressure, in the neighborhood of 125 pounds per square inch is delivered through pipes 48 and 46 to the interior of the longitudinally extending distributing troughs 45, from which it flows through the nipples 36 into the several compartments, into which the space 22 is divided by the vanes 30. The high quality steam is distributed uniformly and evenly throughout the compartments and gives up its latent heat to the outer cylinder 19, which results in a reduction in the quality of the steam, considerable condensation on the inner surface of the outer drum, and a high velocity steam flow. The low quality steam flows from the space 22, inwardly through apertures 33 into the trough 40, with a relatively high velocity flow, which results in a scouring action within the space 22, tending to drive condensate, air, and non-condensable gases toward the trailing end of each compartment. The vanes 30 exert a scooping action on the condensate and force it to flow through the apertures 33 into the trough 40.

Because of the angular disposition of the troughs 40, from end to end, the condensate, through the influence of centrifugal force, inertia, and gravity is caused to flow longitudinally in each trough toward the trailing end thereof, where the condensate is received by the radial pipes 46 for flow through the interior of the journal 11, and for discharge through the pipe 42.

In order that the quality of the steam may be reduced from substantially 100%, when it is introduced, to substantially 10%, when it is discharged through the apertures 33, to produce a high velocity flow and to give up a major portion of its latent heat, it has been found that the total cross-sectional area of the apertures 33 should equal approximately 10% of the total cross-sectional area of the steam space 22. Moreover, in order that the velocity of the flow of steam in the space be high, the radial dimension thereof should be small.

Experiments and theoretical calculations have demonstrated that a drier in accordance with the present invention, using steam pressures of between 125 and 180 pounds per square inch results in an increase of heat transfer of between 22% and 29%, as compared with prior steam jacketed driers, operating at similar pressure, but not provided with the improvements of the present invention.

It must be understood that the invention is not limited to the details of construction shown in the accompanying drawings and described above, as many modifications will occur to those skilled in the art from a consideration of this disclosure. The invention includes all modifications coming within the scope of the appended claims and their equivalents.

We claim:

1. A drier comprising a pair of concentric, closely spaced, inner and outer cylinders mounted for rotation in a predetermined direction and having the interior of the inner cylinder open to the atmosphere, gas-tight sealing means closing the ends of the space between the cylinders, a plurality of vanes extending longitudinally from end to end of the cylinders and dividing the space therebetween into a plurality of longitudinal compartments, the inner cylinder having a row of openings behind each of said vanes and a row of apertures ahead of each vane, means for delivering steam through each row of openings to said compartments adjacent the leading ends thereof and trough means carried by the inner surface of the inner cylinder registering with the rows of apertures for collecting condensate and low quality steam flowing through the apertures in the inner cylinder.

2. A dried comprising a pair of concentric, closely spaced inner and outer steel cylinders of substantially equal wall thickness mounted for rotation about their common axis in a predetermined direction, gas-tight sealing means closing the ends of the space between the cylinders, a plurality of vanes extending longitudinally from end to end of the cylinders, dividing the space therebetween into a plurality of longitudinally extending compartments, said vanes being forwardly and outwardly pitched from the inner to the outer cylinder, the inner cylinder having a row of openings behind each of said vanes and a row of apertures ahead of each vane, means for delivering high quality, high pressure steam, through each row of openings to the said space and trough means carried by the inner surface of the inner cylinder registering with the rows of apertures for collecting condensate and low quality steam flowing from said space through said apertures.

3. A drier comprising a pair of concentric, closely spaced inner and outer steel cylinders of substantially equal wall thickness mounted for rotation about their common axis in a predetermined direction, gas-tight sealing means closing the ends of the space between the cylinders, a plurality of vanes extending longitudinally from end to end of the cylinders, dividing the space therebetween into a plurality of longitudinally extending compartments, said vanes being secured to the outer surface of the inner cylinder and projecting outwardly in forwardly pitched relation into contact with the inner surface of the outer cylinder, means for delivering steam to said compartments behind each of said vanes, said inner cylinder having a row of apertures adjacent the leading face of each vane for the inward flow of low quality steam and condensate, and a plurality of troughs on the inner surface of the inner cylinder registering with said rows of apertures for collecting the inwardly flowing condensate and low quality steam.

4. A drier comprising a pair of concentric, closely spaced inner and outer steel cylinders of substantially equal wall thickness mounted for rotation about their common axis in a predetermined direction, gas-tight sealing means closing the ends of the space between the cylinders, a plurality of vanes extending longitudinally from end to end of the cylinders dividing the space therebetween into a plurality of longitudinally extending compartments, said vanes being secured to the outer surface of the inner cylinder and projecting outwardly in forwardly pitched relation into contact with the inner surface of the outer cylinder and disposed longitudinally in angular relation to axial sections of the cylinders, whereby longitudinal flow is imparted to condensate engaging the vanes, means for delivering steam to the compartments adjacent the leading ends thereof, the inner cylinder having a row of apertures adjacent the trailing end of each compartment opposite the leading face of the associated vane for the inward flow of condensate, and an outwardly facing trough secured to the inner surface of the inner cylinder, enclosing each row of apertures to receive said condensate.

5. A drier comprising a pair of concentric, closely spaced inner and outer steel cylinders of substantially equal wall thickness mounted for rotation about their common axis in a predetermined direction, gas-tight sealing means closing the ends of the space between the cylinders, a plurality of vanes extending longitudinally from end to end of the cylinders dividing the space therebetween into a plurality of longitudinally extending compartments, said vanes being secured to the outer surface of the inner cylinder and projecting outwardly in forwardly pitched relation into contact with the inner surface of the outer cylinder and disposed longitudinally in angular relation to axial sections of the cylinders, whereby longitudinal flow is imparted to condensate engaging the vanes, means for delivering steam to the compartments adjacent the leading ends thereof, the inner cylinder having a row of apertures adjacent the trailing end of each compartment opposite the leading face of the associated vane for the inward flow of condensate and an outwardly facing trough secured to the inner surface of the inner cylinder, enclosing each row of apertures to receive said condensate, each of said troughs being disposed in similar angular relation to an axial section of the cylinders, whereby longitudinal flow is imparted to the condensate received therein, and means connected to the trailing end of each trough for removing condensate therefrom.

6. A jacketed steam drier comprising a pair of concentric, closely spaced inner and outer cylinders, means closing the ends of the space therebetween, means extending longitudinally from end to end of the cylinder for dividing said space into a plurality of longitudinal compartments, a row of openings in the inner cylinder adjacent the leading end of each compartment, a row of apertures of reduced total cross-sectional area as compared to said openings extending through the inner cylinder adjacent the trailing end of each compartment, a plurality of pairs of adjacent troughs extending longitudinally along the inner surface of the inner cylinder with one trough of each pair embracing the openings of one compartment and the adjacent trough of each pair embracing the apertures of the compartment ahead thereof in the direction of rotation of the drier, means for delivering steam to the first trough and means for removing condensate from the second trough.

7. A drier in accordance with claim 6 in which the means for dividing the space between the cylinders into said compartments comprises a plurality of longitudinally extending vanes secured to the outer surface of the inner cylinder, projecting outwardly in forwardly pitched relation and contacting the inner surface of the outer cylinder.

8. A drier in accordance with claim 7 characterized in that the vanes and the troughs are disposed in angular relation to axial sections of the cylinder, whereby longitudinal flow is imparted to condensate engaging the vanes and to condensate received in the second trough, said drier being further characterized by the inclusion of means for removing condensate from the trailing end of the second trough of each pair.

9. In a jacketed drier of the type having an open interior and concentric inner and outer cylinders defining a closed annular steam space therebetween, a central shaft, journal means therefor, means for delivering steam to said space through one journal and means for removing condensate through the other journal, the improvement in the steam delivery and condensate removal means which comprises a plurality of forwardly and outwardly pitched vanes, secured to the outer surface of the inner cylinder making contact with the outer cylinder and dividing said space into a plurality of longitudinal compartments, a row of openings extending through the inner cylinder behind each vane, a row of apertures extending through the inner cylinder adjacent the leading face of each vane, means for delivering steam to all of the openings, a trough on the inner surface of the inner cylinder enclosing each row of apertures, and means connecting each trough to the condensate removal means extending through said other journal.

10. In a jacketed drier of the type having an open interior and concentric inner and outer cylinders defining a closed annular steam space therebetween, a central shaft, journal means therefor, means for delivering steam to said space through one journal and means for removing condensate through the other journal, the improvement in the steam delivery and condensate removal means which comprises a plurality of forwardly and outwardly pitched vanes, secured to the outer surface of the inner cylinder making contact with the outer cylinder and dividing said space into a plurality of longitudinal compartments, a row of openings extending through the inner cylinder behind each vane, a row of apertures extending through the inner cylinder adjacent the leading face of each vane, a trough on the inner surface of the inner cylinder enclosing each row of openings, and means connecting each trough to the means for delivering steam through the first mentioned journal.

11. In a jacketed drier of the type having an open interior and concentric inner and outer cylinders defining a closed annular steam space therebetween, a central shaft, journal means therefor, means for delivering steam to said space through one journal and means for removing condensate through the other journal, the improvement in the steam delivery and condensate removal means which comprises a plurality of forwardly and outwardly pitched vanes, secured to the outer surface of the inner cylinder making contact with the outer cylinder and dividing said space into a plurality of longitudinal compartments, a row of openings extending through the inner cylinder behind each vane, a row of apertures extending through the inner cylinder adjacent the leading face of each vane, a trough on the inner surface of the inner cylinder enclosing each row of openings, means connecting each trough to the means for delivering steam through the first mentioned journal, a second trough positioned adjacent each of the first mentioned troughs on the inner surface of the cylinder enclosing each row of apertures and means connecting each of the second mentioned troughs to the condensate removal means extending through the second journal.

*12. A drier comprising a pair of concentric, closely spaced, inner and outer cylinders mounted for rotation in a predetermined direction and having the interior of the inner cylinder open to the atmosphere, gas-tight sealing means closing the ends of the space between the cylinders, at least one flow resistance ring extending circumferentially of the cylinders intermediate said sealing means, a plurality of vanes extending longitudinally of the cylinders, said rings and said vanes dividing the flow space between the cylinders into a plurality of segmental-annular compartments, the inner cylinder having a row of openings behind each of said vanes and a row of apertures ahead of each vane, means for delivering steam through each row of openings to said compartments adjacent the leading ends thereof and trough means carried by the inner surface of the inner cylinder registering with the rows of apertures for collecting condensate and low quality steam flowing through the apertures in the inner cylinder.*

*13. A drier comprising a pair of concentric, closely spaced inner and outer steel cylinders of substantially equal wall thickness mounted for rotation about their common axis in a predetermined direction, gas-tight sealing means closing the ends of the space between the cylinders, at least one flow resistance ring extending circumferentially of the cylinders intermediate said sealing means, a plurality of vanes extending longitudinally of the cylinders, said rings and said vanes dividing the space between the cylinders into a plurality of segmental-annular flow compartments, said vanes being forwardly and outwardly pitched from the inner to the outer cylinder, the inner cylinder having a row of openings behind each of said vanes and a row of apertures ahead of each vane, means for delivering high quality, high pressure steam, through each row of openings to the said space and trough means carried by the inner surface of the inner cylinder registering with the rows of apertures for collecting condensate and low quality steam flowing from said space through said apertures.*

*14. A jacketed steam drier comprising a pair of concentric, closely spaced inner and outer cylinders, means closing the ends of the space therebetween, at least one resistance ring extending circumferentially of the cylinders intermediate said closing means, a plurality of vanes extending longitudinally of the cylinders, said rings and said vanes dividing the space between the cylinders into a plurality of segmental-annular flow compartments, a row of openings in the inner cylinder adjacent the leading end of each compartment, a row of apertures of reduced total cross-sectional area as compared to said openings extending through the inner cylinder adjacent the trailing end of each compartment, a plurality of pairs of adjacent troughs extending longitudinally along the inner surface of the inner cylinder with one trough of each pair embracing the openings of one compartment and the adjacent trough of each pair embracing the apertures of the compartment ahead thereof in the direction of rotation of the drier, means for delivering steam to the first trough and means for removing condensate from the second trough.*

*15. In a jacketed drier of the type having an open interior and concentric inner and outer cylinders defining a closed annular steam space therebetween, a central shaft, journal means therefor, means for delivering steam to said space through one journal and means for removing condensate through the other journal, the improvement in the steam delivery and condensate removal means which comprises a plurality of forwardly and outwardly pitched vanes, secured to the outer surface of the inner cylinder making contact with the outer cylinder, at least one ring extending circumferentially of the cylinders, said vanes and said resistance ring dividing the flow space between the cylinders into a plurality of segmental-annular compartments, a row of openings extending through the inner cylinder behind each vane, a row of apertures extending through the inner cylinder adjacent the leading face of each vane, a trough on the inner surface of the inner cylinder enclosing each row of openings, means connecting each trough to the means for delivering steam through the first mentioned journal, a second trough positioned adjacent each of the first mentioned troughs on the inner surface of the cylinder enclosing each row of apertures and means connecting each of the second mentioned troughs to the condensate removal means extending through the second journal.*

References Cited in the file of this patent or the original patent

UNITED STATES PATENTS

| | | |
|---|---|---|
| 1,649,511 | Cox | Nov. 15, 1927 |
| 2,150,132 | Sandwell | Mar. 7, 1939 |
| 2,389,133 | Brassert et al. | Nov. 20, 1945 |
| 2,433,121 | Hornbostel | Dec. 23, 1947 |
| 2,498,662 | Eaby | Feb. 28, 1950 |
| 2,582,365 | Westphal | Jan. 15, 1952 |

FOREIGN PATENTS

| | | |
|---|---|---|
| 17,564 | Great Britain | Aug. 23, 1909 |
| 668,025 | Great Britain | Mar. 12, 1952 |

OTHER REFERENCES

Paper Trade Journal, Industrial Development Section, January 20, 1949, pages 16 and 17.